(12) United States Patent
Watanabe et al.

(10) Patent No.: US 9,073,266 B2
(45) Date of Patent: Jul. 7, 2015

(54) METHOD AND APPARATUS FOR LASER WELDING THERMOPLASTIC RESIN MEMBERS

(75) Inventors: Toshio Watanabe, Toyota (JP); Katsuhiko Nakajima, Nisshin (JP); Hideo Nakamura, Toyota (JP); Hiroshi Mori, Hino (JP); Susumu Fujita, Shimotsuke (JP); Mitsunobu Nakatani, Utsunomiya (JP)

(73) Assignees: TOYOTA JIDOSHA KABUSHIKI KAISHA, Aichi-ken (JP); E. I. Du Pont De Nemours and Company, Wilmington, DE (US)

( * ) Notice: Subject to any disclaimer, the term of this patent is extended or adjusted under 35 U.S.C. 154(b) by 1866 days.

(21) Appl. No.: 12/190,001

(22) Filed: Aug. 12, 2008

(65) Prior Publication Data

US 2008/0302484 A1 Dec. 11, 2008

Related U.S. Application Data

(62) Division of application No. 11/582,351, filed on Oct. 18, 2006, now Pat. No. 7,942,998.

(30) Foreign Application Priority Data

Oct. 19, 2005 (JP) ................................. 2005-303811

(51) Int. Cl.
*B29C 65/02* (2006.01)
*B29C 65/16* (2006.01)
(Continued)

(52) U.S. Cl.
CPC ......... *B29C 65/1635* (2013.01); *B29C 65/1606* (2013.01); *B29C 65/1616* (2013.01);
(Continued)

(58) Field of Classification Search
CPC ............ B29C 65/1635; B29C 65/7841; B29C 65/1658; B29C 65/1677; B29C 65/1654; B29C 65/1606; B29C 66/41; B29C 66/1122; B29C 66/91216; B29C 66/91221; B29C 66/9221; B29C 66/836; B29C 66/3494

USPC .................... 156/358, 359, 379.6, 380.9, 580
See application file for complete search history.

(56) References Cited

U.S. PATENT DOCUMENTS

| 5,893,959 A | 4/1999 | Muellich |
| 6,444,946 B1 * | 9/2002 | Korte .......................... 219/121.6 |

(Continued)

FOREIGN PATENT DOCUMENTS

| DE | 19924469 A1 | 11/2000 |
| DE | 20023490 U1 | 6/2004 |

(Continued)

OTHER PUBLICATIONS

International Search Report dated Feb. 22, 2013 in corresponding European Patent Application No. 06255337.5.

*Primary Examiner* — Daniel McNally
(74) *Attorney, Agent, or Firm* — Sughrue Mion, PLLC

(57) ABSTRACT

A method and apparatus for welding members formed of thermoplastic resin material, with high welding strength and small strength variations. A laser welding apparatus 1 brings a first member 2 formed of a transmissive thermoplastic resin that transmits a laser beam into contact with a second member 3 formed of an absorptive thermoplastic resin that absorbs the laser beam, and joins the thermoplastic resin members by melting their contact surfaces 4 with the laser beam. The laser welding apparatus 1 further comprises a laser beam generator 10 for irradiating the contact surfaces with the laser beam shone from the side of the first member 3 so as to melt at least one of the contact surfaces of the first member and the second member. The apparatus also comprises a clamp mechanism 20 for pressing the first member and the second member together, a temperature sensor 31 as an adjusting means for adjusting the pressing force applied to the first member and the second member, and a personal computer 32 for calculating the pressing force based on the output of the temperature sensor. The clamp mechanism is controlled with the calculated pressing force.

10 Claims, 2 Drawing Sheets

(51) Int. Cl.
*B29C 65/78* (2006.01)
*B29C 65/00* (2006.01)
B29K 77/00 (2006.01)
B29K 101/12 (2006.01)

(52) U.S. Cl.
CPC ......... *B29C65/7841* (2013.01); *B29C 66/1122* (2013.01); *B29C 66/8161* (2013.01); *B29C 66/8227* (2013.01); *B29C 66/8242* (2013.01); *B29C 66/91216* (2013.01); *B29C 66/91221* (2013.01); *B29C 66/9221* (2013.01); *B29C 66/939* (2013.01); *B29C 66/9674* (2013.01); *B29K 2077/00* (2013.01); *B29K 2101/12* (2013.01); *B29C 65/1609* (2013.01); *B29C 65/1658* (2013.01); *B29C 66/71* (2013.01); *B29C 66/712* (2013.01); *B29C 66/7212* (2013.01); *B29C 66/73921* (2013.01); *B29C 66/81463* (2013.01); *B29C 66/836* (2013.01); *B29C 66/863* (2013.01); *B29C 66/92441* (2013.01); *B29C 66/92451* (2013.01); *B29C 65/1654* (2013.01); *B29C 65/1677* (2013.01); *B29C 65/1687* (2013.01); *B29C 66/91411* (2013.01); *B29C 66/91431* (2013.01); *B29C 66/3494* (2013.01); *B29C 66/9161* (2013.01); *B29C 66/919* (2013.01); *B29C 66/934* (2013.01); *B29C 66/41* (2013.01); *B29C 66/961* (2013.01)

(56) References Cited

U.S. PATENT DOCUMENTS

| 6,486,433 | B2 | 11/2002 | Greewell et al. |
| 2005/0167042 | A1 | 8/2005 | Hofmann et al. |
| 2006/0153270 | A1* | 7/2006 | Matsumoto et al. .......... 374/120 |

FOREIGN PATENT DOCUMENTS

| EP | 1048439 | A2 | 11/2000 |
| EP | 1535693 | A1 | 7/2009 |
| JP | 2001-347384 | A | 12/2001 |
| JP | 2003-117674 | A | 4/2003 |
| JP | 2003-225946 | A | 8/2003 |
| JP | 2004-074734 | A | 3/2004 |
| JP | 2005-081396 | A | 3/2005 |
| JP | 2005-246913 | A | 9/2005 |
| WO | 03106100 | A1 | 12/2003 |
| WO | WO 03106100 | A1 * | 12/2003 |

* cited by examiner

METHOD AND APPARATUS FOR LASER WELDING THERMOPLASTIC RESIN MEMBERS

This is a divisional of application Ser. No. 11/582,351, filed Oct. 18, 2006, which claims priority from Japanese Patent Application No. 2005-303811, filed Oct. 19, 2005, the disclosures of which are incorporated herein by reference in their entirety.

BACKGROUND OF THE INVENTION

1. Field of the Invention

The invention relates to a method and apparatus for laser welding thermoplastic resin members. In particular, the invention relates to a method and apparatus for joining a member formed of a transmissive thermoplastic resin that transmits a laser beam with a member formed of an absorptive thermoplastic resin that absorbs a laser beam by melting them.

2. Background Art

In response to the demand in recent years for reducing the weight and cost of components in various fields, such as automobile components, such components are often made of resin materials and formed as resin molded items. When a resin molded item having a complex shape is to be formed, a plurality of component parts of the resin molded item are molded in advance and then jointed together by welding for productivity enhancing purposes.

Conventional laser welding apparatuses for welding this kind of resin molded items weld members to be processed by focusing a laser beam produced from a laser oscillator with the use of an optical system, and then irradiating the members therewith. A slidable portion on the members to be processed is provided at the tip of a processing nozzle disposed between a focus lens of the optical system and the members to be processed. A pressure-applying device is also provided for applying pressure on the members to be processed against the slidable portion at the processing nozzle tip (see Patent Document 1, for example).

In another example of a laser welding apparatus, an area of contact of at least two works is irradiated with a laser beam through one of the works so as to melt the contact surfaces and weld the works. The apparatus comprises a laser beam generating means for generating a laser beam, and a spherical lens disposed directly underneath where the laser beam exits the laser beam generating means for focusing the laser beam at the contact area. The spherical lens is adapted to roll on the surface of the work that transmits the laser beam. The apparatus further includes a pushing means for pushing the spherical lens against the work (see Patent Document 2, for example).

Patent Document 1: JP Patent Publication (Kokai) No. 2003-117674 A

Patent Document 2: JP Patent Publication (Kokai) No. 2005-81396 A

SUMMARY OF THE INVENTION

In the laser welding apparatuses of Patent Documents 1 and 2, because the clamping pressure provided by the pressing or pushing is constant, the pressure applied to the welding boundary at the joint becomes deficient. As a result, strength deficiency or variations occur due to the influence of volume contraction. Also, because the pressure at the welded portion drops at once after the laser beam shone from the laser welding system is passed through and the joining surfaces are welded, the pressure to the welding boundary becomes deficient. As a result, strength deficiency or large strength variations occur due to the influence of volume contraction.

The invention has been made in consideration of such problems, and it is an object of the invention to provide a method and apparatus for laser welding thermoplastic resin members capable of providing a high welding strength and smaller strength variations by properly controlling the contact pressure (clamping pressure) between the members during the irradiation of the two members with a laser beam for welding.

In order to achieve the object, the invention provides a method for laser welding thermoplastic resin members that comprises bringing a first member formed of a transmissive thermoplastic resin that transmits a laser beam into contact with a second member formed of an absorptive thermoplastic resin that absorbs the laser beam, and joining the members by melting the contact surfaces with the laser beam. The laser welding method further comprises pressing the two members, irradiating the contact surfaces of the two members with a laser beam shone from the first member side, melting at least one of the contact surfaces of the two members, and welding the two members while adjusting the pressing force applied to the first member and the second member.

In accordance with the method of the invention for laser welding thermoplastic resin members structured as described above, the first member and the second member that are formed of thermoplastic resin are stacked, a laser beam is shone from the first member side while adjusting the pressing force at the contact surfaces of both members, and the two members are welded by heating and melting the contact surfaces. Thus, the volume contraction of the resin melted portion can be reduced by, for example, gently pressing the members when heated, gradually increasing the pressing force when the resin at the joining surfaces is melted, and strongly pressing the members thereafter. Because the joining surfaces of the two members can be made uniform and the welding state becomes stable, a large welding strength can be obtained, and strength variations can be minimized.

The adjustment of pressing force means suitably adjusting the welding strength of the welded portion. For example, it refers to increasing the pressing force during melting relative to an initial pressing force for closely attaching two members and further increasing the pressing force upon cooling. It may also refer to increasing the pressing force during melting with respect to the pressing force for closely attaching two members and decreasing it to the original pressing force upon cooling. The adjustment of pressing force is suitably set in accordance with the shapes, volumes, or the like of the two members to be welded.

In a preferred embodiment of the laser welding method of the invention, the adjustment of the pressing force is carried out based on the detection of temperature at a melted portion of the contact surfaces that is melted by laser beam irradiation. According to the laser welding method thus structured, the expansion state of the melted portion can be detected by detecting the melting temperature of the laser beam irradiation. By performing feedback control such that the pressing force is increased in accordance with the expansion rate, separation of the two members due to expansion of the melted portion, or the development of an air gap between the two members caused by volume contraction upon cooling can be prevented, thereby increasing the density of the welded portion. Therefore, the welding strength can be improved, and the reduction of strength variations can be achieved. Preferably, the pressing force is reduced during laser beam irradiation, gradually increased as melting begins and temperature increases, and then further increased when the melted portion cools and the temperature drops.

In another preferred embodiment of the laser welding method of the invention, the adjustment of the pressing force is carried out based on the detection of pressure at the melted portion of the contact surfaces that is melted by laser beam irradiation. According to the laser welding method thus structured, the expansion and contraction states of the melted portion can be detected by detecting an increase in pressure that occurs when an area near the contact surfaces is melted by laser beam irradiation, or a pressure decrease that occurs when the melted portion cools. By performing feedback control such that the pressing force is changed in accordance with the expansion rate, separation of the two members due to the expansion of the melted portion, or the development of an air gap between the two members due to volume contraction upon cooling can be prevented, thereby increasing the density of the welded portion. Therefore, the welding strength can be improved, and the reduction of strength variations can be achieved. Preferably, the pressing force is reduced during laser beam irradiation, gradually increased when melting begins and the temperature increases, and then further increased when the melted portion cools and the temperature drops.

An apparatus of the invention for laser welding thermoplastic resin members is an apparatus for bringing a first member formed of a transmissive thermoplastic resin that transmits a laser beam into contact with a second member formed of an absorptive thermoplastic resin that absorbs the laser beam, and joining the members by melting their contact surfaces with the laser beam. The apparatus comprises a laser beam generating means for melting at least one of the contact surfaces of the first and second members by irradiating the contact surfaces with the laser beam shone from the first member side, a pressing means for pressing the first member and the second member together, and an adjusting means for adjusting the pressing force applied to the first member and the second member.

In accordance with the thus structured apparatus for laser welding thermoplastic resin members, the first member and the second member are brought into contact with each other, the contact surfaces are irradiated with the laser beam shone from the first member side while the two members are pressed together, and at least one of the contact surfaces is melted. After the melting begins, the pressing force is increased for preventing the separation of the two members. The pressing force is further increased when the melted portion cools, so as to prevent the development of an air gap or the like when the melted portion becomes solidified and to increase the density of the welded portion, thereby increasing the welding strength. Also, strength variations due to the shape of the members or the like can be reduced.

The laser welding apparatus preferably comprises a temperature detecting means for detecting the temperature at the melted portion due to the laser beam irradiation of the first member and the second member, wherein the adjusting means adjusts the pressing force applied to the first member and the second member based on the output of the temperature detecting means. Also preferably, the laser welding apparatus comprises a pressure detecting means for detecting the pressure at the melted portion due to the laser beam irradiation of the first member and the second member, wherein the adjusting means adjusts the pressing force applied to the first member and the second member based on the output of the pressure detecting means.

In this way, the melting state of an area near the contact surfaces of the two members can be detected based on temperature or pressure, and the pressing force applied to the two members can be adjusted by calculating a pressing force suitable for the two members based on a detected temperature or pressure. Thus, it becomes possible to prevent the development of an air gap when the melted portion becomes solidified, by strongly attaching the two members with an increased pressing force when the volume is expanded during melting, and by further increasing the pressing force when the volume is reduced as the melted portion cools. Thus, because a suitable pressing force can be applied by detecting the temperature or pressure at the melted portion, the welding strength can be increased, and the strength variations can be reduced.

The laser welding apparatus comprises a transfer means for transferring the laser beam generator. The pressing means includes a plurality of pressing members for pressing the first member and the second member. It is preferable to adjust the pressing force of the plurality of pressing members during the transfer of the laser beam generator. In accordance with this structure, the melted portion is transferred during the transfer of the laser beam generator, and the pressing force for attaching the two members can be adjusted by the plurality of pressing members in accordance with the state of the melted portion. Therefore, a uniform welding state can be obtained when the portion to be welded is continuous and long, thereby improving the welding strength and reducing the strength variations.

Spring pressure, oil pressure, and/or pneumatic pressure may be employed for the pressing means. By employing spring pressure, oil pressure, and/or pneumatic pressure for the pressing means, the two members can be stably attached to each other. Particularly, the adjustment of pressing force by oil pressure or pneumatic pressure is preferable because it allows for smooth adjustment and fine pressing force control.

In the laser welding method and apparatus according to the present invention, the type of resin employed as the transmissive thermoplastic resin that transmits a laser beam is not particularly limited as long as it has thermoplasticity and transmits a laser beam as a heat source. Examples include polyamide (PA) such as nylon 6 (PA6) or nylon 66 (PA66), polyethylene (PE), polypropylene (PP), styrene-acrylonitrile copolymer, polyethylene terephthalate (PET), polystyrene, ABS, polymethylmethacrylate (PMMA), polycarbonate (PC), and polybutylene terephthalate (PBT). Reinforcing fibers such as glass fiber or carbon fiber, or coloring agent may be added as needed. By "transmit a laser beam", it is meant that the laser beam transmissivity is preferably 20% or more, more preferably 50% or more, even more preferably 80% or more, and most preferably 90% or more.

The type of resin employed as the absorptive thermoplastic resin that absorbs a laser beam is not particularly limited as long as it has thermoplasticity and does not transmit but absorbs a laser beam as a heat source. Examples include polyamide (PA) such as nylon 6 (PA6) or nylon 66 (PA66), polyethylene (PE), polypropylene (PP), styrene-acrylonitrile copolymer, polyethylene terephthalate (PET), polystyrene, ABS, polymethylmethacrylate (PMMA), polycarbonate (PC), polybutylene terephthalate (PBT), and PPS, in which a predetermined coloring agent such as carbon black, dye, or pigment is mixed. Reinforcing fibers such as glass fiber or carbon fiber may be added as needed. By "absorbs a laser beam", it is meant that the laser beam transmissivity is preferably 10% or less, more preferably 5% or less, and even more preferably 1% or less.

With regard to the combination of resins employed for the transmissive thermoplastic resin member and the absorptive thermoplastic resin member, it is preferable that the combination is that of resins having compatibility with each other.

Examples include, other than combinations of resins of the same type such as nylon 6 and nylon 6, or nylon 66 and nylon 66, combinations of nylon 6 and nylon 66, PET and PC, and PC and PBT.

In the laser welding method and apparatus of the invention, the type of a laser beam with which the contact surfaces of two members are irradiated may be suitably selected based on the absorption spectrum, the thickness (transmission length), and the like of the transmissive resin material that transmits the laser beam. Examples include an Nd: glass (neodymium$^{3+}$: glass) laser, an Nd: YAG (neodymium$^{3+}$: YAG) laser, a ruby laser, a helium-neon laser, a krypton laser, an argon laser, a $H_2$ laser, an $N_2$ laser, and a semiconductor laser. Preferable lasers include a YAG: neodymium$^{3+}$ laser (wavelength of the laser beam: 1060 nm) and a semiconductor laser (wavelength of the laser beam: 500 to 1000 nm).

Preferably, the output power of the laser beam is 10 to 900 W. If the output power of the laser beam is less than 10 W, the output power is too low and it becomes difficult to melt the abutment surfaces of the resin materials. If the output power exceeds 900 W, the output power is excessive and the resin materials may evaporate or be transformed in quality.

Thus, in accordance with the method and apparatus of the invention for laser welding thermoplastic resin members, the pressing force is controlled in real-time such that processed members to be welded are pressed with a suitable pressing force. Therefore, the volume expansion of the melted portion, and the volume contraction of the welded portion can be corrected, thereby improving the welding strength and reducing the welding strength variations.

DESCRIPTION OF PREFERRED
EMBODIMENTS OF THE INVENTION

Figure 1:
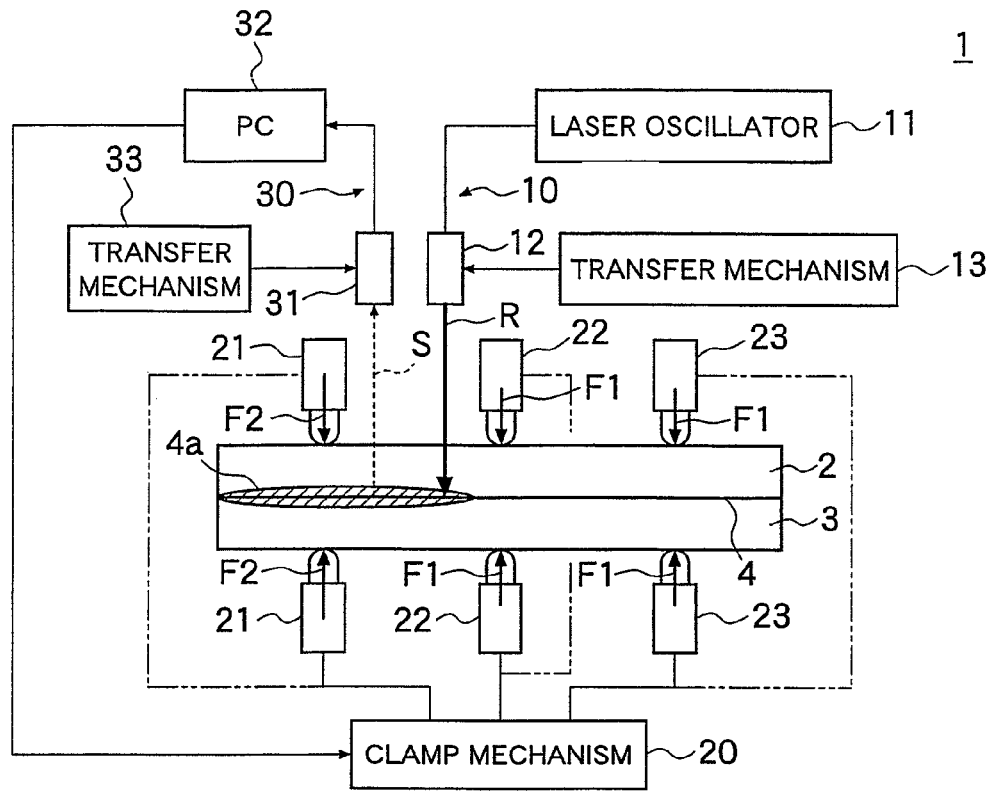
FIG. 1 shows a diagram of a main part of an apparatus for laser welding thermoplastic resin members according to an embodiment of the invention.
Figure 2:
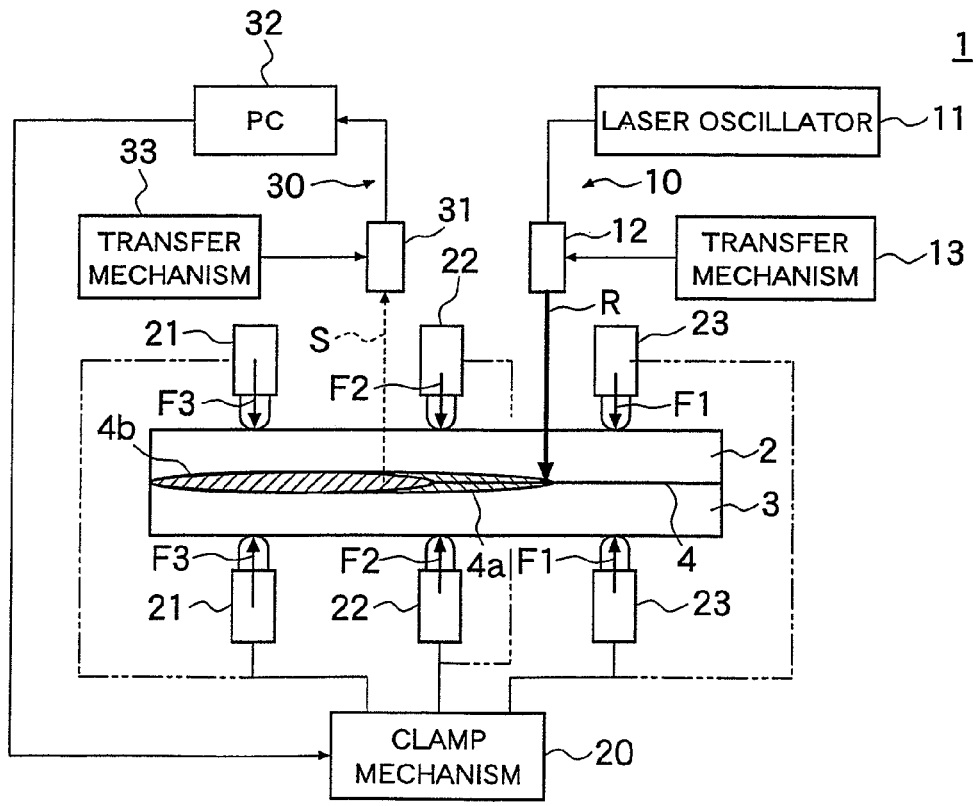
FIG. 2 shows the operation of the apparatus of FIG. 1.

In the following, an embodiment of the laser welding apparatus that implements the method of the invention for laser welding thermoplastic resin members will be described in detail with reference to the drawings. FIG. 1 shows a main part of the apparatus for laser welding thermoplastic resin members according to the embodiment. FIG. 2 shows the operation of the apparatus of FIG. 1.

In FIG. 1, in a laser welding apparatus 1 according to the embodiment, a first member 2 formed of a transmissive thermoplastic resin that transmits a laser beam is brought into contact with a second member 3 formed of an absorptive thermoplastic resin that absorbs the laser beam, and contact surfaces 4 are melted with the laser beam so as to join the members. The laser welding apparatus 1 comprises a laser beam generator 10 for irradiating the contact surfaces 4 of the two members 2 and 3 with a laser beam R from the side of the first member 2 that transmits the laser beam.

The laser beam generator 10 comprises a laser oscillator 11 and a laser head 12 to which the laser oscillator is connected via an optical fiber. The laser beam R irradiated from the laser head is, for example, a semiconductor laser whose wavelength is 940 nm, and preferably its output power is approximately between 10 and 900 W. The laser head 12 is coupled to a transfer mechanism 13 for transferring the laser head at processing speed of, for example, approximately 0.1 to 5 m/min during welding. For the transfer mechanism 13, a suitable structure may be employed such as a structure where an industrial robot is connected to the laser head 12, a structure where members are transferred by employing a two-dimensional stage or a three-dimensional stage, a structure where a focal point is controlled by a combination of an optical lens and a mirror, or a structure where a plurality of spots are simultaneously irradiated with a plurality of laser heads.

The laser beam transmissivity of the transmissive thermoplastic resin material that transmits a laser beam and constitutes the first member 2 is preferably 20% or more, more preferably 50% or more, even more preferably 80% or more, and most preferably 90% or more. The laser beam transmissivity of the absorptive thermoplastic resin material that absorbs the laser beam and constitutes the second member 3 is preferably 10% or less, more preferably 5% or less, or even more preferably 1% or less. Because the resin material that constitutes the second member 3 transmits the laser beam very little, it may be considered a non-transmissive thermoplastic resin material. The second member 3 scarcely transmits but absorbs the laser beam when irradiated therewith, and as a result, the energy of the laser beam accumulates in the second member, thereby generating heat.

The laser welding apparatus 1 comprises a clamp mechanism as a pressing means for pressing and closely attaching the first member 2 and the second member 3. The clamp mechanism 20 is a mechanism for pressing the two members 2 and 3 together that is capable of adjusting the contact pressure by pressing the two members from the outside thereof in the direction of the contact surfaces 4. In the present embodiment, pressure oil is fed from a hydraulic system to cylinders so as to cause the pistons in the cylinders to slide and cause the two members 2 and 3 to be closely attached to each other.

The clamp mechanism 20 shown in the figure comprises three pairs of facing pressing members. A pair of pressing members 21, 21 presses the two members by pinching the left-hand portion of the two members from above and beneath. A middle pair of pressing members 22, 22 presses the two members by pinching the middle portion of the two members from above and beneath. Pressing members 23, 23 press the two members by pinching the right-hand portion of the two members from above and beneath. It is preferable that the pressing members are formed of material having a sufficient degree of hardness, such as metal. The number of pressing members is suitably set in accordance with the shape or the size of the two members.

The clamp mechanism 20 is structured such that the pressing force of the three pairs of pressing members can be individually adjusted by using, for example, hydraulic cylinders. The pressing force by the clamp mechanism, assuming that the direction in which the two stacked members are caused to be attached is plus, does not provide the pressing force in the minus direction (the direction in which the two members are caused to be detached). Namely, the clamp mechanism 20 functions to provide a pressing force suitable for the melting state of the contact surfaces by adjusting the pressing force in the plus direction.

The laser welding apparatus 1 comprises a temperature detecting means (a temperature sensor) 31 for detecting the temperature at a melted portion produced by the laser beam irradiation of the first member 2 and the second member 3, as a means 30 for adjusting the pressing force. This temperature sensor 31 detects a heat ray S irradiated from the melted portion on the side of the first member 2 that is transmissive, which heat ray S is displayed on a monitor for temperature measurement purposes, for example. The measured temperature is inputted to a personal computer (PC) 32, for example. The PC 32 calculates an appropriate pressing force based on the measured temperature, and it is fed back to the clamp mechanism 20, thereby controlling the pressing force in real time. Therefore, the pressing force provided to the two members from the clamp mechanism 20 is calculated based on the measured temperature, and then feedback-controlled. The temperature sensor 31 is coupled to a transfer mechanism 33 that can be moved in a horizontal direction such that the temperature state at the melted portion of the contact surfaces can be detected. While the temperature sensor may detect the temperature from obliquely above in order not to disturb the transfer of the laser head, it is preferable to detect the temperature from directly above.

The real-time control device for detecting the temperature at the melted portion, calculating a suitable pressing force of the clamp mechanism 20 based on the temperature, and pressing two members 2 and 3 together with the thus calculated pressing force may employ a pressure change program prepared in advance whereby a pressing force is calculated in view of the obtained state of the melted portion for controlling the clamp mechanism.

Hereafter, the operation of the laser welding apparatus of the embodiment structured as described above will be described. The first member 2 and the second member 3 are stacked, and then the two members 2 and 3 are pressed by the clamp mechanism 20, so that they become firmly attached to each other. The two members are stacked such that the member 2 that is transmissive faces the laser head 12. At this point, the pressing force of the clamp mechanism 20 is assumed to be F1, which is approximately such that all the pressing members cause the two members 2 and 3 to be lightly attached to each other.

The laser oscillator 11 of the laser beam generating means is activated, and the welded portion of the two members is irradiated with laser beam R shone from the laser head 12. Because the laser beam R is focused at the contact surfaces by an irradiation lens in the laser head, heat is generated at an area near the contact surfaces 4, which is the upper portion of the second member 3 that absorbs the laser beam. When a predetermined amount of laser energy is supplied to the contact surfaces, an area near the contact surface 4 of the second member 3 is melted, which is accompanied by the contact surface of the first member 2 being melted. As a result, both melted portions 4a are fused together whereby the first member 2 and the second member 3 are fused together. In this way, the melted portion of the two members can be made continuous by extending the melted portion 4a by transferring the laser head 12 as the contact surfaces 4 of the two members are melted.

The temperature sensor 31 is transferred by the transfer mechanism 33, and it detects the heat ray S irradiated from the melted portion, thereby detecting the temperature. Upon detecting that the detected temperature is greater than a predetermined temperature and that an area near the contact surfaces is melted, the detected temperature is inputted into the PC 32 for calculating a pressing force F2, which is greater than the initial pressing force value F1. The thus calculated pressing force F2 is fed back to the clamp mechanism 20, which increases the pressing force F1 of the pressing members 21, 21 located near the detected temperature portion, to F2. Due to the increase in pressing force, separation of the two members caused by a volume expansion at the melted portion can be prevented.

As shown in FIG. 2, as the melted portion extends in accordance with the transfer of the laser head 12, cooling starts at the initially melted portion. When the temperature sensor 31 detects the cooling at the melted portion, the temperature decrease is inputted into the PC. Based on the temperature decrease, the PC calculates a pressing force F3, which is greater than previously provided pressing force F2, and then feeds it back to the clamp mechanism 20. The clamp mechanism 20 increases the pressing force F2 of the pressing members 21 to the calculated pressing force F3, whereby the development of an air gap in the melted portion caused by volume decrease that accompanies the contraction of the melted portion can be prevented.

As the laser head 12 is transferred by the transfer mechanism 13 and the melted portion 4a is extended, the initially melted portion gradually cools. When the cooling state is detected by the temperature sensor 31, the pressing force of the pressing members close to the cooling portion is increased, whereby the development of an air gap in the melted portion can be prevented. The welding of the two members is completed when the pressing force applied to all the continuous melted portions is sequentially increased and they all become solidified when cooled. Namely, the PC 32 that constitutes the adjusting means 30 calculates the pressing force supplied to the plurality of pressing members 21 to 23, such that the pressing force is increased from F1 to F2 and further increased to F3, as the laser head 12 is transferred.

Thus, a change in temperature due to the laser beam irradiation of the two members 2 and 3 attached by the pressing force F1 is detected and initially small pressing force F1 is increased to pressing force F2 when the contact surfaces are melted. As the melted portion cools, the pressing force is increased to even greater pressing force F3 such that the pressing members 21 to 23 have a suitable pressing force. Therefore, because the welding state can be made uniform and the density of the welded portion can be kept high, the welding strength can be increased and the welding strength variations can be reduced.

Figure 3:
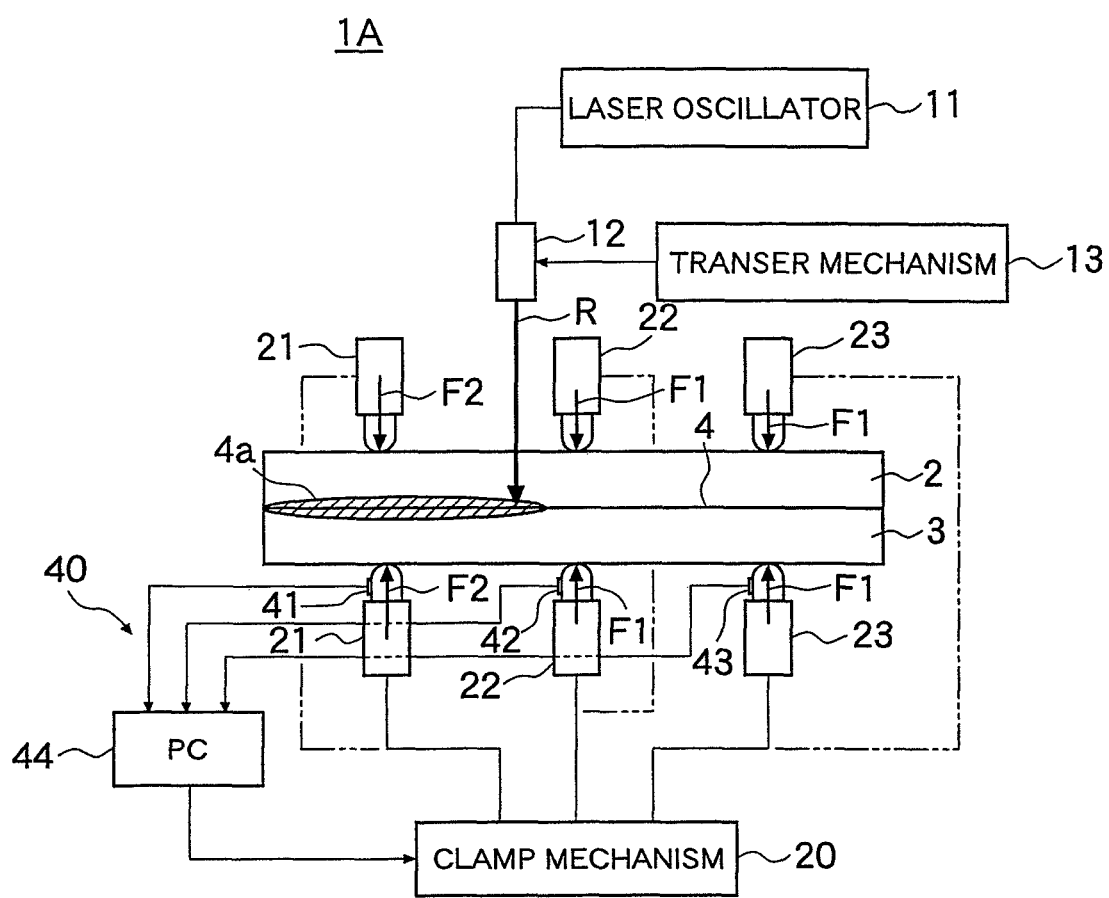
FIG. 3 shows a diagram of a main part of an apparatus for laser welding thermoplastic resin members according to another embodiment of the invention.

Another embodiment of the invention will be explained in detail with reference to FIG. 3. FIG. 3 shows a main part of another embodiment of the laser welding apparatus of the invention. This embodiment, as opposed to the above-mentioned embodiment, adjusts the pressing force by detecting pressure indicative of the state of the melted portion where the contact surfaces of the two members are melted. Other substantially equivalent elements are designated with the same numerals.

In FIG. 3, as a means 40 for adjusting the pressing force of the clamp mechanism 20, a laser welding apparatus 1A of the embodiment comprises a pressure detecting means (pressure sensors) 41 to 43 for detecting the pressure at the melted portion where the first member 2 and the second member 3 are irradiated with a laser beam. These pressure sensors 41 to 43 are mounted, for example, at the piston portions of the pressing members 21 to 23, and they detect pressure via the pressure sensors, such as strainmeters, based on deformation due to the volume expansion of the melted portion 4a melted by the laser beam R. The thus detected pressure is inputted to an arithmetic device such as a personal computer (PC) 44 where a suitable pressing force is calculated based on the pressure, and fed back to the clamp mechanism 20 for controlling pressing force in real time.

In the thus constructed laser welding apparatus 1A of the embodiment, when the contact surfaces 4 of the two members 2 and 3 are melted by laser beam R irradiation, the output from the pressure sensor 41 mounted at the pressing member 21 changes due to the volume expansion of the melted portion 4a. Specifically, while the pressing member 21 is pressed with an initial pressing force F1, the pressing force outputted from the pressure sensor 41 is increased with the addition of pressure accompanying a volume expansion. In this way, upon detecting that the portion irradiated with the laser beam R has been melted, the PC 44 calculates a suitable pressing force F2, which is greater than the pressing force F1, based on the output from the pressure sensor 41. The pressing force F2 calculated in this way is fed back to the clamp mechanism 20, which then increases the pressing force F1 of the pressing member 21, which is located close to the detected pressure portion, to F2. The increase in the pressing force prevents the separation of the two members due to the volume expansion of the melted portion 4a.

As the melted portion 4a extends in accordance with the transfer of the laser head 12, cooling starts at the initially melted portion. Namely, when the melted portion expanded by melting cools and becomes a melted portion 4b due to volume contraction, the pressure sensor 41 detects the cooling of the melted portion 4a. The pressure decrease is inputted to the PC 44. Then, the PC 44 calculates the pressing force F3, which is greater than the pressing force F2 previously provided based on the pressure decrease, and feeds it back to the clamp mechanism 20. The clamp mechanism 20 increases the pressing force of the pressing member 21 from F2 to F3.

Because the clamp mechanism 20 increases the pressing force F2 of the pressing member 21 to the calculated pressing force F3, the development of an air gap in the welded portion 4b due to the volume decrease accompanying the contraction of the melted portion 4a can be prevented. As the laser head 12 is transferred by the transfer mechanism 13, and the melted portion 4b is extended, the initially melted portion gradually cools. Upon detecting the cooling state by the pressure sensors, the pressing force of a pressing member near the detected portion is increased, thereby preventing the development of an air gap in the melted portion 4b. The pressing force is sequentially increased for all the continuous melted portions, which are cooled and become solidified into a welded portion, thereby completing the welding of the two members.

Thus, in this embodiment as well, the welding state can be made uniform and the density of the welded portion 4b can be kept high by detecting the pressure state of the attached two members, increasing the pressing force provided to a plurality of pressing members from the initially small pressing force F1 to F2 when the contact surfaces are melted, and further increasing it to a greater pressing force F3 when the melted portion cools. Therefore, the welding strength becomes higher, and the welding strength variations can be reduced.

While the embodiments of the invention have been specifically described above, the invention is not limited to the above-described embodiments. Various changes or modifications may be made within the scope of the claims without departing from the spirit of the invention. For example, while a structure was described in which the two members are pressed by pinching from above and beneath as a means for pressing the two members together, the two members may be stacked on a fixed base or the like, and then the pressing force may be provided from above.

Obviously, the thermoplastic resins include examples other than those described above, such as general-purpose thermoplastic resins, general-purpose engineering plastics, super engineering plastics, and thermoplastic elastomers. The transmissive thermoplastic resin of which the first member is comprised and which transmits the laser beam preferably has high transmissivity. The absorptive thermoplastic resin of which the second member is comprised and which absorbs a laser beam preferably has low transmissivity. Preferably, the difference in transmissivity between the two members is large.

INDUSTRIAL APPLICABILITY

The invention enables welding in which the welding strength is improved and the strength variations are reduced by selecting a first member formed of a transmissive thermoplastic resin and a second member formed of an absorptive thermoplastic resin, having different laser beam transmissivities. Because the invention prevents the development of a burrs or the like at the welded portion, the quality of the welded portion can be improved and, therefore, the invention can be applied to the welding of various types of resins and resin components.

What is claimed is:

1. An apparatus for laser welding thermoplastic resin members in which a first member formed of a transmissive thermoplastic resin that transmits a laser beam is brought into contact with a second member formed of an absorptive thermoplastic resin that absorbs the laser beam, and their contact surfaces are melted with the laser beam for joining the members, the apparatus comprising:
   a laser beam generating means for irradiating the contact surfaces with a laser beam shone from the side of the first member so as to melt at least one of the contact surfaces of the first member and the second member;
   a pressing means for pressing the first member and the second member together by a pressing force;
   an adjusting means for adjusting the pressing force applied to the first member and the second member;
   a detecting means for detecting a temperature or a pressure at a melted portion melted by laser beam irradiation of the first member and the second member, and
   a controller configured to directly control the adjustment means based on the detected temperature or pressure;
   wherein the controller controls the pressing force by increasing the pressing force to a first pressing force when a detected temperature or pressure is greater than a predetermined value, and further increasing the pressing force to a second pressing force when another detected temperature or pressure indicates cooling at the melted portion.

2. The apparatus for laser welding thermoplastic resin members according to claim 1, wherein the detecting means comprises a pressure detecting means for detecting the pressure at the melted portion melted, and
   wherein the adjusting means adjusts the pressing force applied to the first member and the second member based on an output of the pressure detecting means.

3. The apparatus for laser welding thermoplastic resin members according to claim 2, comprising a transfer means for transferring the laser beam generating means,
   wherein the pressing means comprises a plurality of pressing members for pressing the first member and the second member, and adjusts the pressing force applied to the plurality of pressing members in accordance with the transfer of the laser beam generating means.

4. The apparatus for laser welding thermoplastic resin members according to claim 2, wherein the pressing means employs one or a plurality of spring pressure, oil pressure, and pneumatic pressure.

5. The apparatus for laser welding thermoplastic resin members according to claim 1, wherein the detecting means comprises a temperature detecting means for detecting the temperature at the melted portion, and wherein the adjusting means adjusts the pressing force applied to the first member and the second member based on an output of the temperature detecting means.

6. The apparatus for laser welding thermoplastic resin members according to claim 5, wherein the pressing means employs one or a plurality of spring pressure, oil pressure, and pneumatic pressure.

7. The apparatus for laser welding thermoplastic resin members according to claim 5, comprising a transfer means for transferring the laser beam generating means, wherein the pressing means comprises a plurality of pressing members for pressing the first member and the second member, and adjusts the pressing force applied to the plurality of pressing members in accordance with the transfer of the laser beam generating means.

8. The apparatus for laser welding thermoplastic resin members according to claim 1, comprising a transfer means for transferring the laser beam generating means,
wherein the pressing means comprises a plurality of pressing members for pressing the first member and the second member, and adjusts the pressing force applied to the plurality of pressing members in accordance with the transfer of the laser beam generating means.

9. The apparatus for laser welding thermoplastic resin members according to claim 8, wherein the pressing means employs one or a plurality of spring pressure, oil pressure, and pneumatic pressure.

10. The apparatus for laser welding thermoplastic resin members according to claim 1, wherein the pressing means employs one or a plurality of spring pressure, oil pressure, and pneumatic pressure.

* * * * *